US012028193B2

(12) United States Patent
Honkala et al.

(10) Patent No.: US 12,028,193 B2
(45) Date of Patent: Jul. 2, 2024

(54) RADIO RECEIVER

(71) Applicant: Nokia Solutions and Networks Oy, Espoo (FI)

(72) Inventors: Mikko Johannes Honkala, Espoo (FI); Dani Johannes Korpi, Helsinki (FI); Janne Matti Juhani Huttunen, Espoo (FI); Vesa Starck, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/910,038

(22) PCT Filed: Feb. 17, 2021

(86) PCT No.: PCT/FI2021/050111
§ 371 (c)(1),
(2) Date: Sep. 8, 2022

(87) PCT Pub. No.: WO2021/181002
PCT Pub. Date: Sep. 16, 2021

(65) Prior Publication Data
US 2023/0362042 A1 Nov. 9, 2023

(30) Foreign Application Priority Data
Mar. 12, 2020 (FI) ..................... 20205261

(51) Int. Cl.
*H04L 25/03* (2006.01)
*H04B 7/0413* (2017.01)
(Continued)

(52) U.S. Cl.
CPC ..... *H04L 25/03165* (2013.01); *H04B 7/0413* (2013.01); *H04L 5/0048* (2013.01);
(Continued)

(58) Field of Classification Search
CPC .......... H04L 25/03165; H04L 5/0098
(Continued)

(56) References Cited

U.S. PATENT DOCUMENTS

| 8,934,851 | B2 | 1/2015 | Doi |
| 2021/0144779 | A1* | 5/2021 | Vahdat ..................... G06N 3/08 |
| 2021/0158151 | A1* | 5/2021 | Wang .................... H04L 12/189 |

FOREIGN PATENT DOCUMENTS

| JP | 2003174485 A | 6/2003 |
| JP | 2004104769 A | 4/2004 |

(Continued)

OTHER PUBLICATIONS

Elwekeil et al. "Deep Convolutional Neural Networks for Link Adaptations in MIMO-OFDM Wireless Systems", Published in: IEEE Wireless Communications Letters, vol. 8, Issue: 3, Jun. 2019 (Year: 2019).*

(Continued)

*Primary Examiner* — Leila Malek
(74) *Attorney, Agent, or Firm* — Joseph C. Drish; Harrington & Smith

(57) ABSTRACT

According to an example embodiment, a radio receiver includes at least one processor and at least one memory including computer program code. The at least one memory and the computer program code may be configured to, with the at least one processor, cause the radio receiver to: obtain a data array including a plurality of elements, wherein each element in the plurality of elements in the data array corresponds to a subcarrier in a plurality of subcarriers and to a timeslot in a time interval; obtain a reference signal array representing a reference signal configuration applied during the time interval; implement a neural network; input data into the neural network, wherein the data includes at least the data array and the reference signal array. A radio (Continued)

receiver, a method and a computer program product are disclosed.

16 Claims, 12 Drawing Sheets

(51) Int. Cl.
  *H04L 5/00* (2006.01)
  *H04L 25/02* (2006.01)
  *H04L 27/26* (2006.01)
(52) U.S. Cl.
  CPC ........ *H04L 5/0098* (2013.01); *H04L 25/0224* (2013.01); *H04L 25/0254* (2013.01); *H04L 27/26134* (2021.01)
(58) Field of Classification Search
  USPC .......................................................... 375/262
  See application file for complete search history.

(56) References Cited

FOREIGN PATENT DOCUMENTS

| | | | |
|---|---|---|---|
| JP | 2019101792 A | | 6/2019 |
| KR | 20120020682 | * | 3/2012 |
| WO | WO-2019080987 A1 | | 5/2019 |
| WO | WO-2019093268 A1 | * | 5/2019 ............ G06T 9/002 |
| WO | WO-2020035920 A1 | | 12/2020 |

OTHER PUBLICATIONS

Narengerile, J. et al., "Deep Learning for Signal Detection in Non-Orthogonal Multiple Access Wireless Systems", 2019 UK/China Emerging Technologies (UCET), Glasgow, UK, Aug. 2019, 4 pgs.
Zhao, Z. et al., "Deep-Waveform: A Learned OFDM Receiver Based on Deep Complex Convolutional Networks", Nov. 2019, 12 pgs.
Baek, M. et al., "Implementation Methodologies of Deep Learning-Based Signal Detection for Conventional MIMO Transmitters", IEEE Transactions on Broadcasting, vol. 65, No. 3, Sep. 2019, 7 pgs.
Huang, H. et al., "Deep Learning for Physical-Layer 5G Wireless Techniques: Opportunities, Challenges and Solutions", IEEE Wireless Communications, Feb. 2020, 18 pgs.
Zhao, Zhongyuan, "Deep-Waveform: A Learned OFDM Receiver Based on Deep Complex Convolutional Networks" Cornell University Library, Oct. 16, 2018, 12 pages.
Zhou, Zhou, et al., "Learning for Detection: MIMO-OFDM Symbol Detection through Downlink Pilots", IEEE Transactions On Wireless Communications, vol. 19, No. 6, Jun. 2020, 15 pages.

* cited by examiner

RADIO RECEIVER

CROSS REFERENCE TO RELATED APPLICATION

This patent application is a U.S. National Stage application of International Patent Application Number PCT/FI2021/050111 filed Feb. 17, 2021, which is hereby incorporated by reference in its entirety, and claims priority to FI 20205261 filed Mar. 12, 2020.

TECHNICAL FIELD

The present application generally relates to the field of wireless communications. In particular, the present application relates to a radio receiver device for wireless communication, and related methods and computer programs.

BACKGROUND

Radio receiver algorithms may comprise blocks that are based on mathematical and statistical algorithms. These algorithms may be developed and programmed manually, which may be labor intensive. For example, it requires large amounts of manual labor to implement different reference signal configurations. Receiver algorithms designed this way may perform adequately for most channel conditions but may not give the best possible performance for any of the channels. It may also be difficult to estimate how algorithms developed based on theoretical channel conditions align with actual physical channel conditions.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a radio receiver comprises at least one processor and at least one memory comprising computer program code. The at least one memory and the computer program code are configured to, with the at least one processor, cause the radio receiver to: obtain a data array comprising a plurality of elements, wherein each element in the plurality of elements in the data array corresponds to a subcarrier in a plurality of subcarriers and to a timeslot in a time interval; obtain a reference signal array representing a reference signal configuration applied during the time interval; implement a neural network; input data into the neural network, wherein the data comprises at least the data array and the reference signal array; wherein the neural network is configured to, based on the data, output an output array representing values of the plurality of elements in the data array, wherein the values comprise bits or symbols. The radio receiver may be able to, for example, receive data transmitted using various reference signal configurations.

An example embodiment of a radio receiver comprises means for performing: obtain a data array comprising a plurality of elements, wherein each element in the plurality of elements in the data array corresponds to a subcarrier in a plurality of subcarriers and to a timeslot in a time interval; obtain a reference signal array representing a reference signal configuration applied during the time interval; implement a neural network; input data into the neural network, wherein the data comprises at least the data array and the reference signal array; wherein the neural network is configured to, based on the data, output an output array representing values of the plurality of elements in the data array, wherein the values comprise bits or symbols.

In an example embodiment, alternatively or in addition to the above-described example embodiments, the neural network comprises a convolutional neural network. The radio receiver may be able to, for example, handle correlations and/or impairments in time and frequency via convolutional operations in the convolutional neural network.

In an example embodiment, alternatively or in addition to the above-described example embodiments, the reference signal array comprises a plurality of reference signals, wherein a location in the reference signal array of each reference signal in the plurality of reference signals indicates a subcarrier of the reference signal and a timeslot of the reference signal. The radio receiver may be able to, for example, interpolate channel estimates over various reference signal configurations.

In an example embodiment, alternatively or in addition to the above-described example embodiments, the reference signal array further comprises a preconfigured indicator value in each location of the reference signal array not comprising a reference signal. The radio receiver may be able to, for example, ignore the elements in the reference signal array not comprising reference signals when performing channel estimation.

In an example embodiment, alternatively or in addition to the above-described example embodiments, the reference signal array comprises a plurality of convolutional channels, wherein each convolutional channel in the plurality of convolutional channels in the reference signal array corresponds to a layer of a multiple-input and multiple-output, MIMO, transmission. The radio receiver may be able to, for example, utilize the reference signals for receiving a MIMO transmission.

In an example embodiment, alternatively or in addition to the above-described example embodiments, the neural network further comprises at least one residual block. The radio receiver may be able to, for example, receive data more efficiently.

In an example embodiment, alternatively or in addition to the above-described example embodiments, the at least one memory and the computer program code are further configured to, with the at least one processor, cause the radio receiver to: obtain a frequency array representing subcarrier frequencies of the plurality of subcarriers; wherein the data further comprises the frequency array. The radio receiver may be able to, for example, utilize physical properties of a wireless channel that depend on the used frequency band.

In an example embodiment, alternatively or in addition to the above-described example embodiments, at least one convolutional channel in the plurality of convolutional channels of the data corresponds to the reference signal array. The radio receiver may be able to, for example, input the reference signal array into the neural network with improved flexibility.

In an example embodiment, alternatively or in addition to the above-described example embodiments, at least one convolutional channel in the plurality of convolutional channels of the data corresponds to the frequency array. The radio receiver may be able to, for example, input the frequency array into the neural network with improved flexibility.

In an example embodiment, alternatively or in addition to the above-described example embodiments, the data array comprises a plurality of convolutional channels and data from a plurality of antenna streams, wherein each convolutional channel in the data array corresponds to an antenna stream in the plurality of antenna streams. The radio receiver may be able to, for example, input the antenna streams into the neural network with improved flexibility.

In an example embodiment, alternatively or in addition to the above-described example embodiments, the at least one memory and the computer program code are further configured to, with the at least one processor, cause the radio receiver to: extract a subset of bits from each element of the output array based on a modulation scheme used for the time interval and for the plurality of subcarriers. The radio receiver may be able to, for example, flexibly receive data using various modulation schemes.

In an example embodiment, alternatively or in addition to the above-described example embodiments, the at least one memory and the computer program code are further configured to, with the at least one processor, cause the radio receiver to: receive raw data using a plurality of samples during the time interval; and perform a Fourier transform on the received raw data, producing the data array. The radio receiver may be able to, for example, operation in a compatible fashion with OFDM-based technologies.

An example embodiment of a radio receiver comprises the radio receiver according to any of the above-described example embodiments.

An example embodiment of a network node device comprises the radio receiver according to any of the above-described example embodiments.

An example embodiment of a method for training the neural network of the radio receiver according to any of the above-described example embodiments comprises: obtaining a training input dataset and a ground truth corresponding to the training input dataset; inputting a training input dataset into the neural network, wherein the training input dataset comprises a training data array comprising a plurality of elements, wherein each element in the plurality of elements in the training data array corresponds to a subcarrier in a plurality of subcarriers and to a timeslot in a time interval; receiving an estimated output of the training input dataset from the neural network representing bit values of the plurality of elements in the training data array; extracting a subset of bits from each element of the estimated output based on a modulation scheme used for the training input dataset; computing a cost function based on the extracted bits and bits comprised in the ground truth; and adjusting at least one parameter of the neural network according to the computed cost function. The method may enable the neural network to be trained to function flexibly with various modulation schemes.

An example embodiment of a computer program product comprises program code configured to perform the method according to any of the above example embodiments, when the computer program product is executed on a computer.

DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings.

Like reference numerals are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present disclosure may be constructed or utilized. The description sets forth the functions of the example and the sequence of steps for constructing and operating the example. However, the same or equivalent functions and sequences may be accomplished by different example embodiments.

Figure 1:
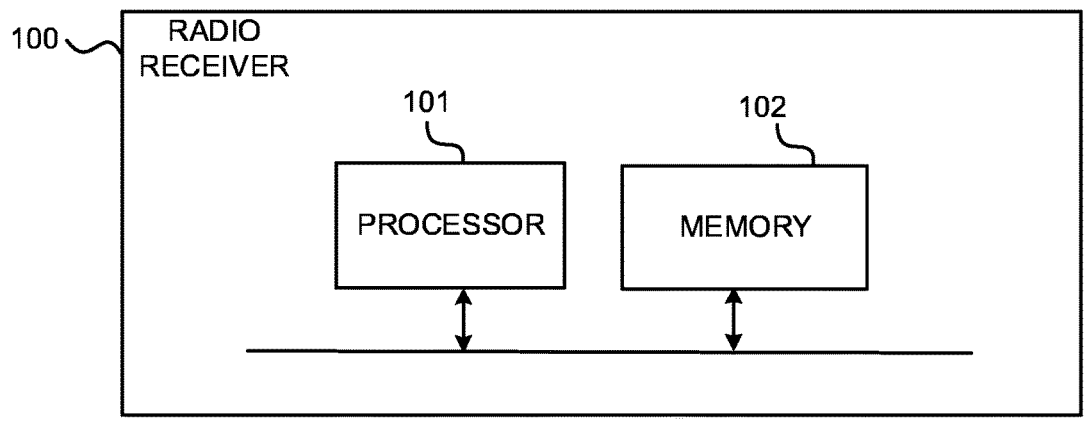
FIG. 1 illustrates an example embodiment of the subject matter described herein illustrating a radio receiver.

FIG. 1 is a block diagram of a radio receiver 100 configured in accordance with an example embodiment.

The radio receiver 100 may comprises one or more processors 101 and one or more memories 102 that comprise computer program code. The radio receiver 100 may also comprise at least one antenna port, as well as other elements, such as an input/output module (not shown in FIG. 1), and/or a communication interface (not shown in FIG. 1).

According to an example embodiment, the at least one memory 102 and the computer program code are configured to, with the at least one processor 101, cause the radio receiver 100 to obtain a data array comprising a plurality of elements, wherein each element in the plurality of elements in the data array corresponds to a subcarrier in a plurality of subcarriers and to a timeslot in a time interval.

The plurality of subcarriers may correspond to, for example, subcarriers of a code/resource block.

The time interval may correspond to, for example, a transmission time interval (TTI).

The data may be transmitted using, for example, orthogonal frequency-division multiplexing (OFDM). Each subcarrier in the plurality of subcarriers may correspond to an OFDM subcarrier.

The data array may correspond to, for example a code block.

Each timeslot may correspond to one OFDM symbol in time domain.

Each element in the plurality of elements may correspond to, for example, a symbol in a symbol constellation. The symbol constellation may depend on the modulation scheme used for the received data.

The at least one memory 102 and the computer program code may be further configured to, with the at least one processor 101, cause the radio receiver 100 to obtain a reference signal array representing a reference signal configuration applied during the time interval.

The at least one memory 102 and the computer program code may be further configured to, with the at least one processor 101, cause the radio receiver 100 to implement a neural network.

The neural network may have been trained as disclosed herein.

The neural network may comprise, for example, a convolutional neural network. Alternatively, the neural network may be implemented using, for example, attention mechanisms and/or transformer neural networks.

The at least one memory 102 and the computer program code may be further configured to, with the at least one processor 101, cause the radio receiver 100 to input data into the neural network, wherein the data comprises at least the data array and the reference signal array.

The data may further comprise any other information as disclosed herein.

The data may comprise a three-dimensional array. A first dimension of the data may correspond to frequency, a second dimension of the data may correspond to time, and a third dimension of the data may correspond to convolutional channel. The convolutional channel dimension of the data or of any other array disclosed herein may also be referred to as depth dimension or channel dimension. The third dimension of the data may correspond to different types of data.

The neural network may be configured to, based on the data, output an output array representing values of the plurality of elements in the data array, wherein the values comprise bits or symbols.

The output array may comprise, for example, log likelihood ratios (LLRs) or raw bit values.

The radio receiver may perform the obtaining the data array by, for example, receiving raw data using a plurality of samples during the time interval and performing a Fourier transform on the received raw data, producing the data array.

Although the radio receiver 100 may be depicted to comprise only one processor 101, the radio receiver 100 may comprise more processors. In an example embodiment, the memory 102 is capable of storing instructions, such as an operating system and/or various applications.

Furthermore, the processor 101 may be capable of executing the stored instructions. In an example embodiment, the processor 101 may be embodied as a multi-core processor, a single core processor, or a combination of one or more multi-core processors and one or more single core processors. For example, the processor 101 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 101 may be configured to execute hard-coded functionality. In an example embodiment, the processor 101 is embodied as an executor of software instructions, wherein the instructions may specifically configure the processor 101 to perform the algorithms and/or operations described herein when the instructions are executed.

The memory 102 may be embodied as one or more volatile memory devices, one or more non-volatile memory devices, and/or a combination of one or more volatile memory devices and non-volatile memory devices. For example, the memory 102 may be embodied as semiconductor memories (such as mask ROM, PROM (programmable ROM), EPROM (erasable PROM), flash ROM, RAM (random access memory), etc.).

The radio receiver 100 may be embodied in e.g. a mobile phone, a smartphone, a tablet computer, a smart watch, or any hand-held or portable device or any other apparatus, such as a vehicle, a robot, or a repeater.

The radio receiver 100 may be embodied in, for example, a network node device, such as a base station (BS). The base station may comprise, for example, a gNB or any such device providing an air interface for client devices to connect to the wireless network via wireless transmissions.

When the radio receiver 100 is configured to implement some functionality, some component and/or components of the radio receiver 100, such as the at least one processor 101 and/or the memory 102, may be configured to implement this functionality. Furthermore, when the at least one processor 101 is configured to implement some functionality, this functionality may be implemented using program code comprised, for example, in the memory 102. For example, if the radio receiver 100 is configured to perform an operation, the at least one memory 102 and the computer program code can be configured to, with the at least one processor 101, cause the radio receiver 100 to perform that operation.

Some terminology used herein may follow the naming scheme of 4G or 5G technology in its current form. However, this terminology should not be considered limiting, and the terminology may change over time. Thus, the following discussion regarding any example embodiment may also apply to other technologies.

Figure 2:
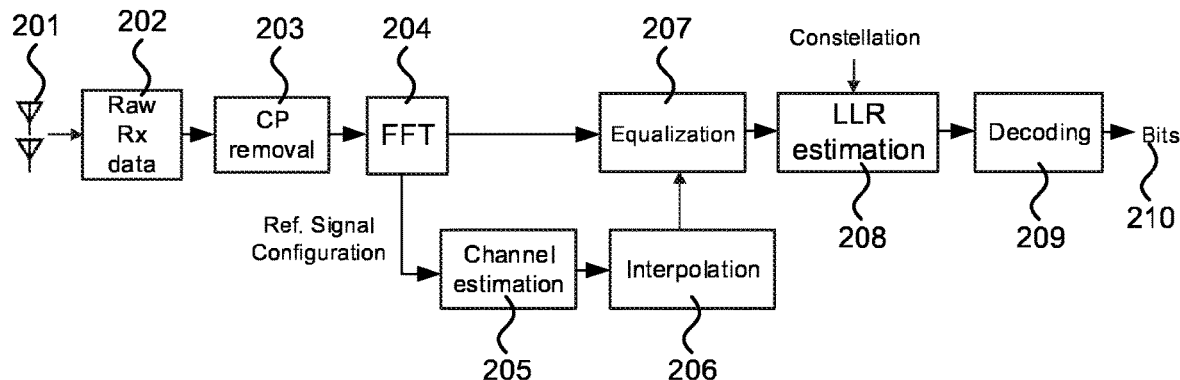
FIG. 2 illustrates a comparative example of the subject matter described herein illustrating block diagram of a radio receiver.

FIG. 2 illustrates a comparative example of the subject matter described herein illustrating block diagram of a radio receiver.

The radio receiver may be electrically coupled to one or more antennas 201. The radio receiver may obtain raw received data 202 form the one or more antennas 201. The radio receiver may be configured to remove 203 a cyclic prefix (CP) from the raw received data 202. The radio receiver 200 may be configured to perform a Fourier transform, using for example fast Fourier transform (FFT), on the raw received data 202.

The radio receiver may be configured to perform channel estimation 205 and interpolation 206 based on reference signal configuration.

The radio receiver may be configured to perform equalization 207 based on the Fourier transformed data and the channel estimates. After equalization 207, the radio receiver 200 may perform log likely hood ratio (LLR) estimation 208. Based on the LLR, the radio receiver 200 may decode 209 the bit values 210.

Figure 3:
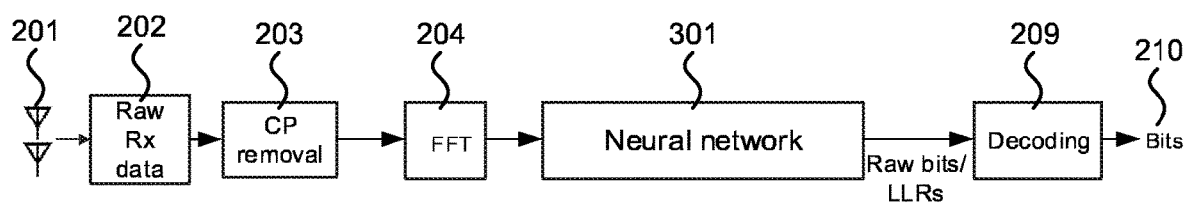
FIG. 3 illustrates an example embodiment of the subject matter described herein illustrating block diagram of a radio receiver comprising a neural network.

FIG. 3 illustrates an example embodiment of the subject matter described herein illustrating block diagram of a radio receiver 100.

As can be seen by comparing the example embodiment of FIG. 3 to the comparative example of FIG. 2, The neural network 301 may replace, for example, the functional blocks 205-208.

The neural network 301 may take in the partially processed received waveform and output the information as, for example, the log-likelihood ratios (LLRs) or directly the decoded bits. In the former case, a separate decoder 209 may be required to process the neural network output to obtain the information bits 210. For example, low-density parity check (LDPC) decoder may be needed to obtain 5G uplink shared channel (UL-SCH) data. The neural network 301 can be trained to perform at least some functionality of the radio receiver 100 by training with an appropriate training algorithm and data.

The structure of the radio receiver 100 may allow fast and efficient implementation of the radio receiver 100 using neural network chips and/or AI accelerators. It is also likely that under some circumstances, such as under particular channel conditions and/or with very sparse reference signal configurations, a neural network radio receiver will result in improved performance.

Many radio transmitters and receivers are based on orthogonal frequency-division multiplexing, where the symbols are modulated onto orthogonal subcarriers. For instance, in 5G systems, OFDM is used both in the uplink (UL) and in the downlink (DL), such that it is possible to multiplex different users into adjacent subcarrier blocks (orthogonal frequency division multiple access, OFDMA).

The neural network 301 may implement channel estimation 205 (subcarrier demapping), equalization 207 and LLR estimation 208 (bit detection). Moreover, the radio receiver 100 may be able to handle flexible de-modulation reference signal (DMRS) configurations, multi-layer MIMO, and various modulation schemes, such as quadrature phase shift keying (QPSK) or quadrature amplitude modulation (QAM).

The neural network 301 may be implemented using a convolutional neural network (CNN). The neural network 301 may take in the received data after FFT 204 and output LLRs or bit values. The CNN may be two dimensional and operate over the time and frequency axis. The CNN can simultaneously consider all subcarriers and symbols in a transmission time interval (TTI). This way, the convolutional filters in the CNN can implicitly handle correlations and/or impairments in time and frequency, which stem from the antenna configuration, multipath propagation, and mobility.

Sparse pilot symbols may only provide local information about the channel. It may be beneficial to allow the neural network to utilize the unknown data and its known distribution for improved LLR estimation further away from the pilot locations. Thus, the LLR estimation may be improved when both data and pilot signals are input to the neural network in a coherent fashion. This may allow the neural network to utilize both for carrying out LLR estimation. For example, the neural network may learn some version of an advanced iterative receiver scheme.

Figure 4:
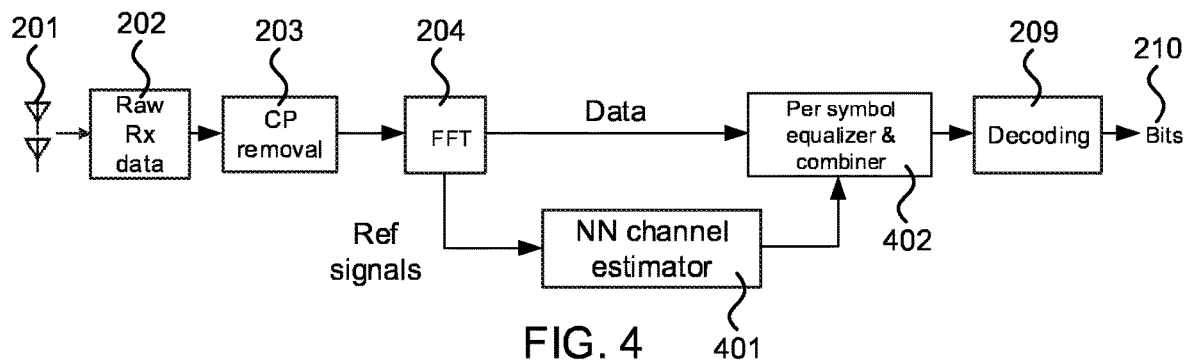
FIG. 4 illustrates a comparative example of the subject matter described herein illustrating block diagram of a radio receiver comprising a neural network for channel estimation.

FIG. 4 illustrates a comparative example of the subject matter described herein illustrating block diagram of a radio receiver.

In the comparative example of FIG. 4, the channel estimation 205 and the interpolation 206 are replaced with a neural network channel estimator 401. The channel estimate can be combined with the Fourier transformed data in equalized and combiner 402.

Figure 5:
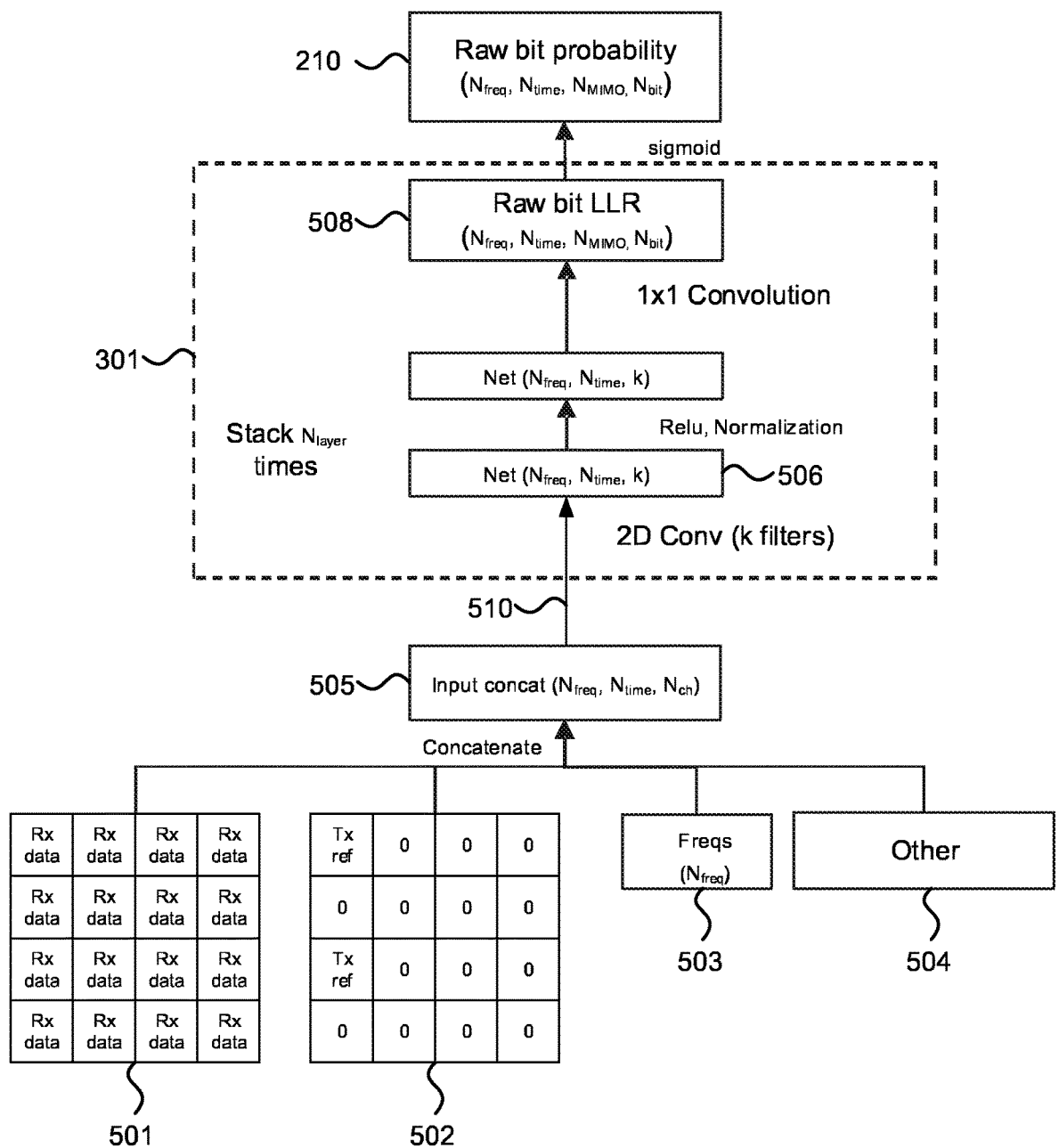
FIG. 5 illustrates an example embodiment of the subject matter described herein illustrating data flow in a neural network.

FIG. 5 illustrates an example embodiment of the subject matter described herein illustrating data flow in a neural network.

The radio receiver 100 may be configured to combine various information sources into the data 510. For example, the radio receiver 100 may concatenate 505 various information sources to form the data 510. After the concatenation 505, the various information sources may correspond to convolutional channels of the data 510. Thus, the information sources 501-504 may be concatenated in the depth dimension of the data 510.

The data 510 may also be referred to as neural network input data or similar.

One-dimensional vectors and two-dimensional matrices may be expanded to three-dimensional arrays. Thus, a single three-dimensional array may be formed as the data 510. The data 510 may be fed into the neural network 301.

The data 510 may comprise the data array 501. The data array 501 may be received Fourier transformed data. The data array 501 may be obtained as the output of FFT 204 in the example embodiment of FIG. 3.

The data array 501 may be represented as a three-dimensional array with dimensions $N_{freq}$ (number of subcarriers in the plurality of subcarriers)$\times N_{time}$ (number of timeslots in the time interval)$\times N_{ant}$ (the number of antenna streams). $N_{time}$ may be, for example, 14 in 5G.

The at least one memory and the computer program code may be further configured to, with the at least one processor, cause the radio receiver 100 to obtain a reference signal array 502 representing a reference signal configuration applied during the time interval. The data 510 may further comprise the reference signal array 502.

The reference signal array 502 may represent reference signals (pilot configuration) that are applied during the time interval. The reference signal array 502 may be used for channel estimation. For example, a single user case, the dimensions of the reference signal array 502 may be $N_{freq} \times N_{time}$.

The reference signal array 502 may comprise a plurality of reference signals, wherein a location in the reference signal array of each reference signal in the plurality of reference signals indicates a subcarrier of the reference signal and a timeslot of the reference signal. For example, in the example embodiment of FIG. 5, the reference signal array 502 comprises two reference signals.

The reference signal array 502 may further comprise a preconfigured indicator value in each location of the reference signal array 502 not comprising a reference signal. The preconfigured indicator value may indicate that the corresponding element of the reference signal array 502 does not comprise a reference signal. For example, in the example embodiment of FIG. 5, the reference signal array 502 comprise zeros as the preconfigured indicator values.

An element of the reference signal array 502 may be non-zero if the corresponding subcarrier and timeslot is a reference signal. The values of the non-zero elements may be filled with the reference signal values.

For MIMO, the reference signal array 502 may be three-dimensional. Reference signal configurations for each MIMO channel using the same subcarrier frequency can be stacked in the depth dimension.

The at least one memory and the computer program code may be further configured to, with the at least one processor, cause the radio receiver to obtain a frequency array 503 representing subcarrier frequencies of the plurality of subcarriers. The data 510 may further comprise the frequency array 503.

By feeding the frequencies of the subcarriers to the neural network 301, it may also be possible to process one time interval in multiple blocks over the frequency axis. This approach can be used to limit the size of the neural network 301 if computational resources of radio receiver 100 are not sufficient to process whole time interval at once. Further, the physical properties of a wireless channel can depend on the frequency band. Thus, it may also be beneficial to allow the neural network 301 to utilize this information.

Dimensions of the frequency array 503 may be $N_{freq} \times 1$. The frequency array 503 may comprise a vector representing subcarrier frequencies. This may provide information about the subcarrier frequencies for the neural network 301. This may allow the network to specialize some lower level filters to act differently based on the subcarrier frequency. The frequency array 503 may also add the capability to process any part of the frequencies separately, for instance because of hardware or load requirements.

The data may comprise a plurality of convolutional channels.

At least one convolutional channel in the plurality of convolutional channels of the data may correspond to the reference signal array.

At least one convolutional channel in the plurality of convolutional channels of the data may correspond to the frequency array.

The data 510 may further comprise other information 504. The other information 504 may comprise, for example, information about the encoding, UE identifier, UE scheduling information etc.

After the concatenation 505, the dimensions of the data 510 may be $N_{freq} \times N_{time} \times N_{ch}$, where $N_{ch}$ is the number of convolutional channels. The number of convolutional channels may also be referred to as depth. Thus, after the concatenation 505, different data types, such as the data array 501, the reference signal array 502, and the frequency array 503, may be stacked in the convolutional channel/depth dimension of the data 510.

The neural network 301 may comprise at least one two-dimensional convolutional layer operating in time and frequency directions. The neural network 301 may comprise a plurality of such convolutional layers.

Each convolutional layer in the neural network 301 may comprise k filters. The depth of each filter may be equal to the depth of the input of that layer. For example, the depth of each filter in the first layer of the neural network 301 may be $N_{ch}$. Thus, when each of the k filters is convoluted with the data 510 in the frequency and time dimensions, a new three-dimensional array 506 of size $N_{freq} \times N_{time} \times k$ may be produced.

Each filter in the neural network 301 may be, for example, of size 3×3 or of any other size.

The neural network 301 may comprise, for example 10-20 convolutional layers.

In the convolution operations of the neural network 301 zero padding may be used. Alternative padding schemes, such as period padding, may also be used.

In some cases, it may be beneficial to use such a padding that the $N_{freq}$ and $N_{time}$ dimensions remain constant through the neural network 301.

In the convolution operations of the neural network 301, after two-dimensional convolutions in the frequency and time dimensions, the results may be summed over the convolutional channel direction.

Alternatively or additionally, other type of convolution operations, such as depth wise separable convolution, may be implemented in the neural network 301.

The neural network 301 may further comprise nonlinearity, such as Rectified Linear Unit (ReLU), and possible normalization, such as batch normalization during training. Each convolutional layer in the neural network 301 may comprise a ReLU and/or other nonlinearity.

Each layer in the neural network 301 may comprise distinct weights. The weights may correspond to the elements of the filters. Weight may also be referred to as parameter, model parameter, or similar.

Convolutions may make it possible to handle correlations and/or impairments in time and frequency due to, for example, antenna configuration and mobility of UE (Doppler shift/spread). Convolutions may also improve interpolation of channel information over the time interval, since the channel estimates should be interpolated over those subcarriers and symbols where the actual data symbols are transmitted.

The neural network 301 may further comprise at least one residual block.

The output of the final convolutional layer can be fed to a 1×1 convolution that combines the output convolutional channels from two-dimensional convolutional layers producing bit LLRs 508. The 1×1 convolutional layer may have $N_{MIMO} \cdot N_{bit}$ output channels, where $N_{MIMO}$ is the number of MIMO layers and $N_{bit}$ is the maximum number of bits per symbol. For example, for support up to 256QAM, $N_{bit}=8$.

The output of the neural network 301 may be reshaped to $N_{freq} \times N_{time} \times N_{MIMO} \times N_{bit}$ elements and each element can be fed into the sigmoid function. The sigmoid function can output the output the probability 201 of each bit being 1. The output array may comprise these probabilities.

Since the outputs of the sigmoid layer are the bit probabilities, the input to the sigmoid layer corresponds to LLRs with a possible multiplication with −1 depending on the used convention. In other words, the output of the 1×1 convolution layer before the sigmoid may give the corresponding bit LLRs.

In some example embodiments, the neural network 301 may be configured to output bit LLRs 508 in the output array. In some example embodiments, the neural network 301 may be configured to output bit probabilities 509 in the output array. In some example embodiments, the neural network 301 may be configured to output bit values in the output array.

Any operations performed by the neural network 301 can be in complex or real domain. This may depend on, for example, the hardware the neural network 301 is implemented on. The disclosure herein may assume complex operations as the data array 501 may be a Fourier transformed signal. For an implementation using real operations, the real and imaginary parts of a complex number can be fed to convolutional channels of the neural network 301. In such a case, the number of convolutional channels in the data 510 may be doubled compared to the complex case.

The neural network 301, may process a whole TTI/code block as a single pass through the neural network 301. Thus, the neural network 301 can implicitly learn channel estimation and interpolation over the whole TTI. Moreover, processing the whole code block may be beneficial for the final decoding stage, since this may result in more accurate signal-to-noise ratio (SNR) estimation.

Figure 6:
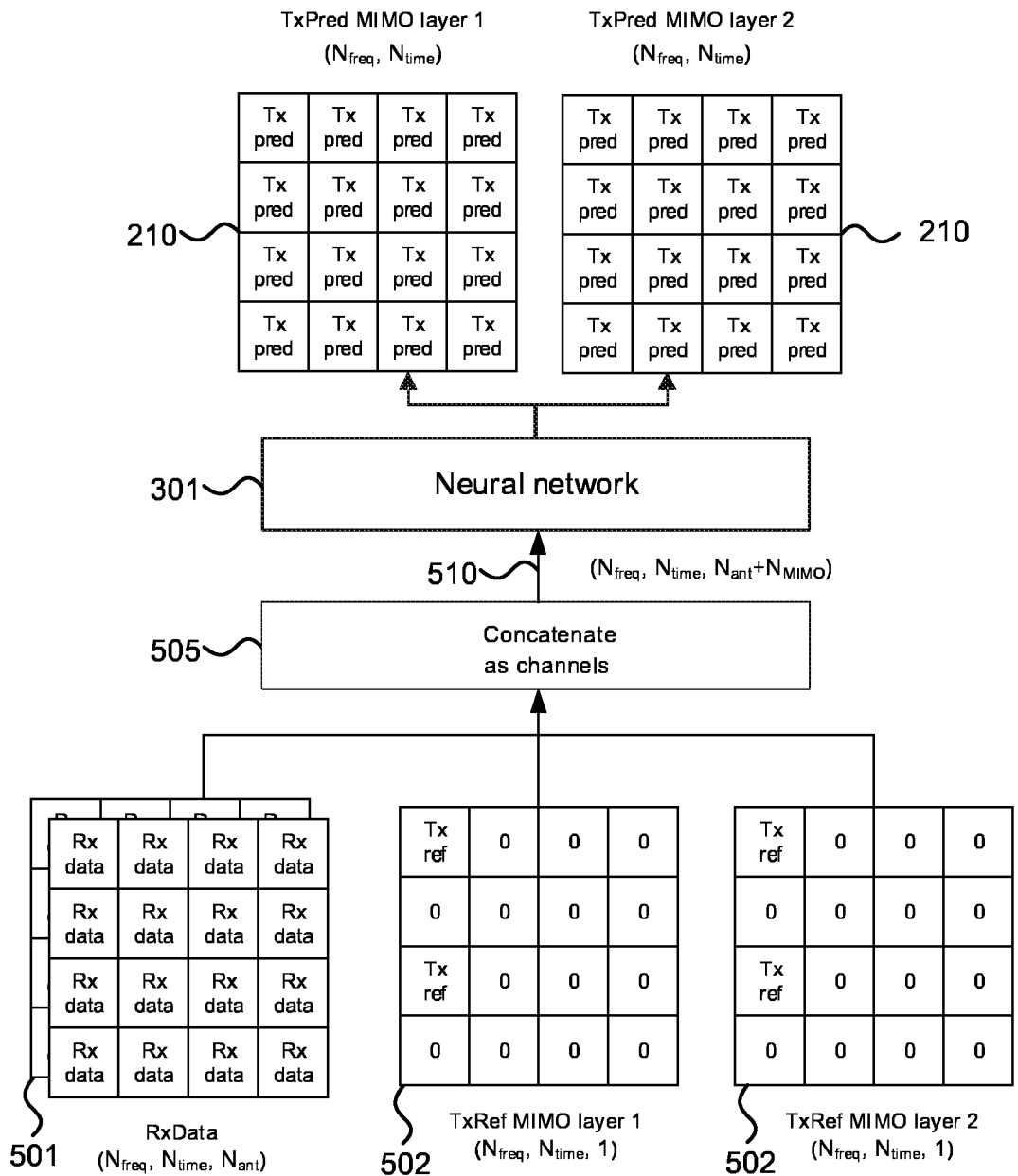
FIG. 6 illustrates another example embodiment of the subject matter described herein illustrating data flow in a neural network configure for MIMO.

FIG. 6 illustrates an example embodiment of the subject matter described herein illustrating flow data in a neural network configured for multiple-input and multiple-output (MIMO).

The data array 501 may comprise a plurality of convolutional channels and data from a plurality of antenna streams, wherein each convolutional channel in the data array 501 corresponds to an antenna stream in the plurality of antenna streams. The convolutional channels may also be referred to as input channels.

The reference signal array 502 may comprise a plurality of convolutional channels, wherein each convolutional channel in the plurality of convolutional channels in the reference signal array 502 corresponds to a layer of a MIMO transmission. The layers may be, for example, from a single user MIMO or mixed single- and multi-user MIMO.

In the example embodiment of FIG. 6, the data array 501 comprises two convolutional channels. Each convolutional channel may correspond to a separate antenna stream. Furthermore, the reference signal array 502 comprises two convolutional channels. Each convolutional channel may correspond to a MIMO layer.

The antenna streams of the data array 510 and the MIMO layers of the reference signal array 502 may be concatenated into the data 510.

The neural network 301 may output LLRs 508 for each MIMO layer based on the data 510.

The example embodiment of FIG. 6 may apply to multi-user MIMO or single-user MIMO. In multi-user MIMO, the number of MIMO layers may correspond to the number of MIMO users.

Figure 7:
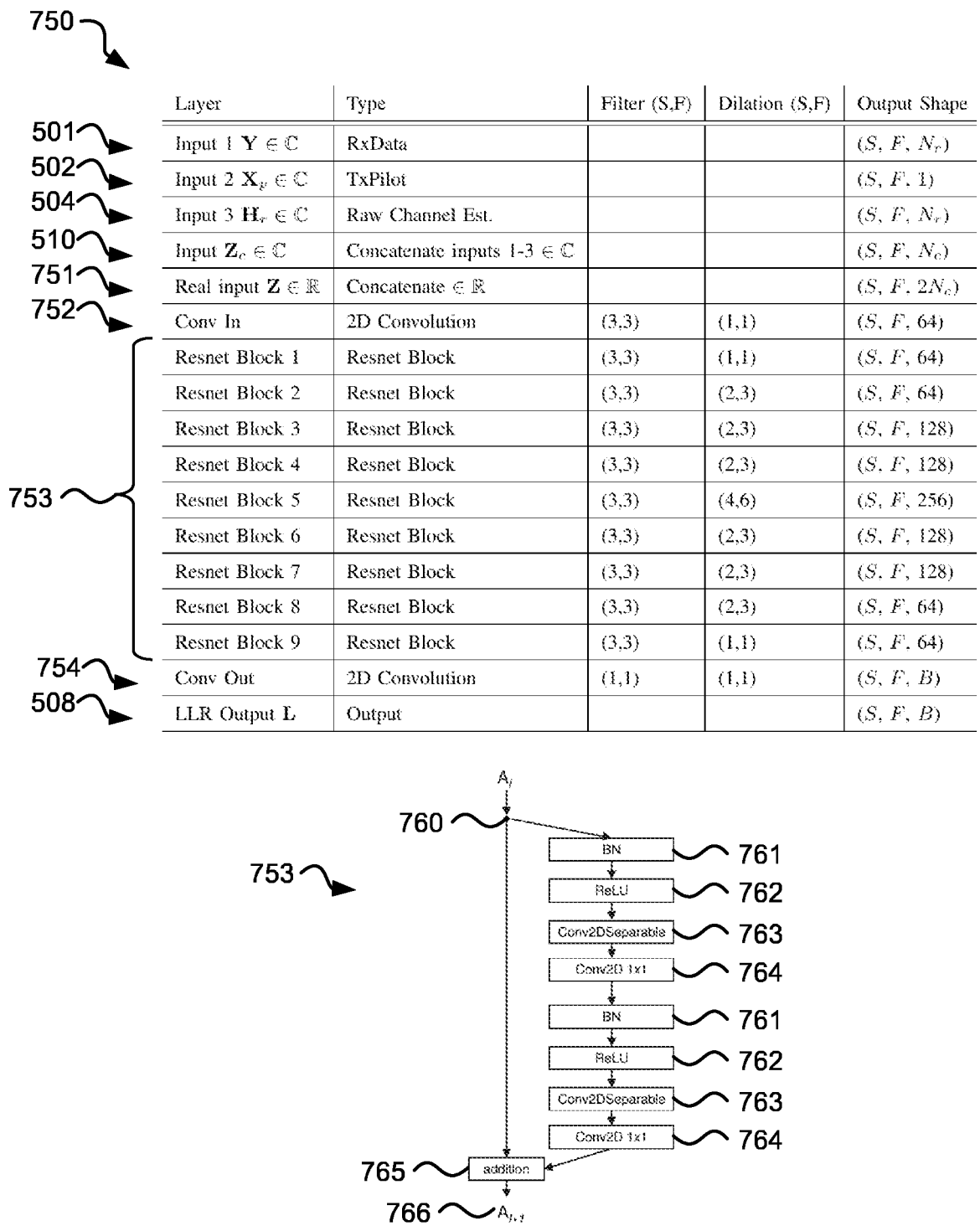
FIG. 7 illustrates another example embodiment of the subject matter described herein illustrating a table of neural network parameters and a residual network block.

FIG. 7 illustrates another example embodiment of the subject matter described herein illustrating a table 750 of neural network parameters and a residual network block 753.

In the example embodiment of FIG. 7, a data array 501, a reference signal array 502, and a channel estimate array 504 are concatenated to form the data 510. The data 510 is split into real and imaginary parts, which produces an array 751 comprising double the number of convolutional channels compared to the complex data 510.

The neural network of the example embodiment of FIG. 7 comprises a first convolutional layer 752, nine residual network blocks 753, and a 1×1 convolutional layer 754. The 1×1 convolutional layer 754 outputs the LLRs 508.

In the example embodiment of FIG. 7, each residual network block 753 comprises two batch normalization (BN) blocks 761, two ReLU blocks 762, two separable two-dimensional convolutional blocks 763, and two 1×1 two-dimensional convolutional blocks 764. The input 760 of the residual network block 753 is fed to a first BN block 761, the output of the first BN block 761 is fed into a first the ReLU block 762, the output of the first ReLU block 762 block is fed into a first separable two-dimensional convolutional block 763, and the output of the first separable two-dimensional convolutional block 763 is fed into a first 1×1 convolutional block 764. The process is then repeated for the output of the first 1×1 convolutional block 764 using a second BN block 761, a second ReLU block 762, a second separable two-dimensional convolutional block 763, and a second 1×1 two-dimensional convolutional block 764. The output of the second 1×1 two-dimensional convolutional block 764 is then summed 765 with the input 760, producing the output 766 of the residual network block 753.

Figure 8:
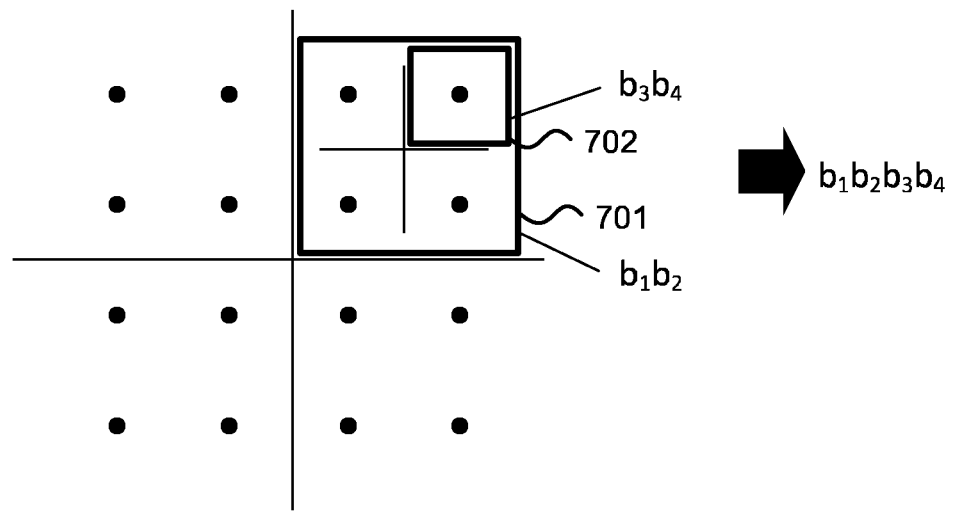
FIG. 8 illustrates another example embodiment of the subject matter described herein illustrating a constellation diagram.

FIG. 8 illustrates another example embodiment of the subject matter described herein illustrating a constellation diagram.

The embodiment of FIG. 8 illustrates how bit values can be extracted from a symbol in a 16 quadrature amplitude modulation (QAM) constellation. The first two bit values $b_1b_2$ can be determined by the quarter of the complex plane in which the symbol lies. For example, in the embodiment of FIG. 8, the symbol is in the first quarter 701 of the complex plane.

The next two bit values $b_3b_4$ can be determined by dividing the first quarter 701 again into four quarters and choosing the quarter 702 in which the symbol lies.

Higher order QAM constellations may be constructed in a hierarchical manner by following a similar process. For example, in 32QAM, the quarter 702 may be divided again into quarters to determine the next two bits values and so on for higher order QAM constellations.

Figure 9:
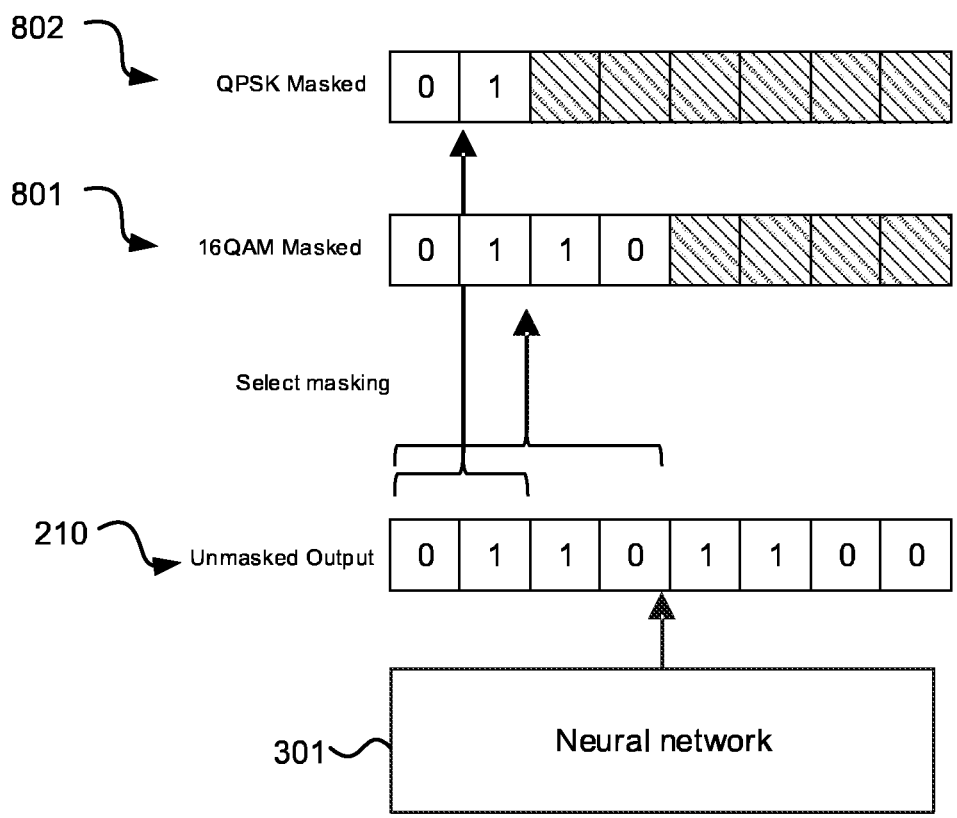
FIG. 9 illustrates another example embodiment of the subject matter described herein illustrating bit extraction.

FIG. 9 illustrates another example embodiment of the subject matter described herein illustrating bit extraction.

According to an example embodiment, the at least one memory and the computer program code are further configured to, with the at least one processor, cause the radio receiver 100 to extract a subset of bits from each element of the output array based on a modulation scheme used for the time interval and for the plurality of subcarriers.

The radio receiver 100 may extract certain the subset of bits by, for example, masking certain bits. This way, the radio receiver may construct the final bit stream according to the used modulation scheme.

For example, if $2^n$QAM is used, the radio receiver 100 may extract n bits. The extracted bits may comprise n first bits of each element of the output array.

For example, if QPSK or 4QAM is used, the radio receiver 100 may extract the first two bits 802 as illustrated in the example embodiment of FIG. 9.

On the other hand, if 16QAM is used, the radio receiver 100 may extract the first four bits 801 as illustrated in the example embodiment of FIG. 9.

The subset of bits can be extracted during the use of the radio receiver 100 and/or during the training of the neural network 301. The neural network can there-fore learn to map the different bit output nodes into the different hierarchical quartiles of the constellation. Thus, the neural network 301 may be trained to function with various different modulation schemes.

Figure 10:
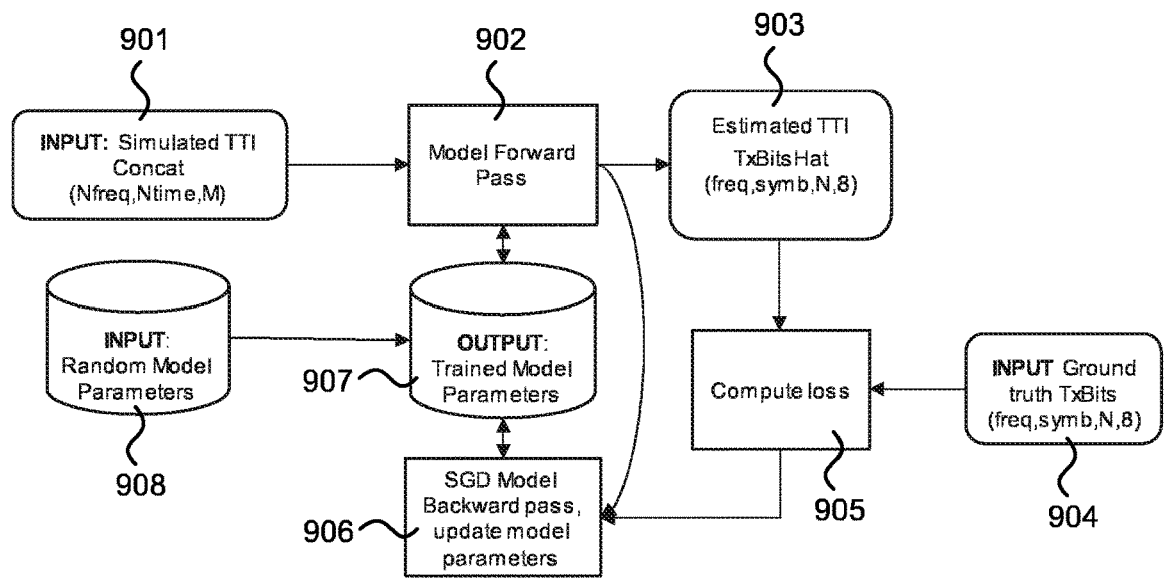
FIG. 10 illustrates another example embodiment of the subject matter described herein illustrating data flow in neural network training.

FIG. 10 illustrates another example embodiment of the subject matter described herein illustrating data flow in neural network training.

According to an embodiment, a method for training a neural network for the radio receiver comprises obtaining a training input dataset and a ground truth corresponding to the training input dataset.

The training input dataset may be part of a plurality of training data records. Each such training data record may be used for training the neural network.

The method may further comprise inputting a training input dataset into the neural network. The training input dataset may comprise a training data array comprising a plurality of elements, wherein each element in the plurality of elements in the training data array corresponds to a subcarrier in the plurality of subcarriers and to a timeslot in the time interval.

The input training dataset may comprise, for example, simulated data 901. The simulated data 901 may be generated using, for example, link-level simulator. The simulated data 901 may be generated by simulating transmitter-receiver chain and storing sent encoded bits (for ground truth), received signal and other relevant information such as reference signal configurations and parameters.

At the start of the training, the neural network 301 may be configured with random parameters 908.

The simulated data 901 may be fed into the neural network. This may be referred to as model forward pass 902.

The method may further comprise receiving an estimated output of the training input dataset from the neural network representing bit values of the plurality of elements in the training data array.

The estimated output may comprise the estimated bit values 903 for the input training dataset.

The method may further comprise extracting a subset of bits from each element of the estimated output based on a modulation scheme used for the training input dataset. The bits may be extracted, for example, in a manner disclosed herein. The bits may be extracted, for example, in a similar manner as in the example embodiment of FIG. 9. Since the bits are extracted based on the modulation scheme used, the neural network 301 may be trained to function with various modulation schemes.

The method may further comprise computing a cost function based on the extracted bits and bits comprised in the ground truth.

The cost function may be computed by, for example, comparing the extracted bit values 903 to the ground truth bit values 904. The ground truth bit values 904 may be obtained from a training dataset. The cost function 905 may comprise, for example, the cross-entropy loss between the ground truth bits 904 and extracted bits 903.

The method may further comprise adjusting at least one parameter of the neural network according to the computed cost function. The at least one parameter of the neural network may comprise, for example, at least one weights of the neural network 301.

The adjustment of the at least one parameter may be referred to as backward pass 906. The parameters may be adjusted using, for example, stochastic gradient decent (SGD) or its extensions (e.g. Adam optimizer) and back-propagation. This may output trained parameters 907.

The above description of the training process may correspond only to part of the training process. The parameters of the neural network 301 may be adjusted in an iterative fashion, whereby the forward pass 902 is performed after each adjustment. Based on how the previous parameter adjustment changes the value of the loss function 905, further adjustments can be deduced using, for example, SGD. Such iteration of the parameters can be continued until, for example, the loss function reaches a preconfigured threshold or until some other condition for the performance of the neural network 301 is reached.

The training may be performed by any computing device, such as a computer. For example, the training can be performed in the cloud with simulated or real data collected from the BS. No ground truth channel information may be needed for training, only the received RX signals and ground truth bits may be required.

Any disclosure herein in relation to the data 510 may apply also to the training input dataset.

The training input dataset may further comprise a reference signal array. The reference signal array may comprise a plurality of reference signals, wherein a location in the reference signal array of each reference signal in the plurality of reference signals indicates a subcarrier of the reference signal and a timeslot of the reference signal. The reference signal array may further comprise a preconfigured indicator value in each location of the reference signal array not comprising a reference signal. The reference signal array may comprise a plurality of convolutional channels, wherein each convolutional channel in the plurality of convolutional channels in the reference signal array corresponds to a layer of a MIMO transmission.

The training input dataset may further comprise a frequency array representing subcarrier frequencies of the plurality of subcarriers.

The training input dataset may comprise a plurality of convolutional channels. At least one convolutional channel in the plurality of convolutional channels of the dataset corresponds to the reference signal array. At least one convolutional channel in the plurality of convolutional channels of the training input dataset may correspond to the frequency array. The data array may comprise a plurality of convolutional channels and data from a plurality of antenna streams. Each convolutional channel in the data array may correspond to an antenna stream in the plurality of antenna streams.

Figure 11:
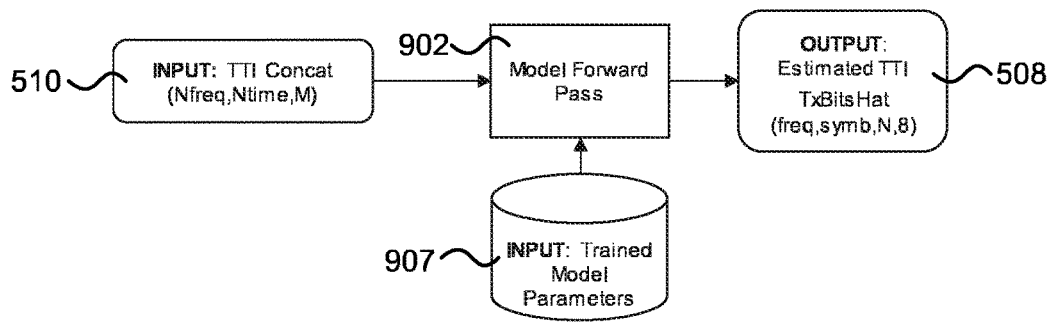
FIG. 11 illustrates another example embodiment of the subject matter described herein illustrating data flow when using a trained neural network.

FIG. 11 illustrates another example embodiment of the subject matter described herein illustrating data flow when using a trained neural network.

The output of the training procedure may be the trained model parameters 907. These may also be referred to as a simulation-trained model. This model can be used in production as shown in the example embodiment of FIG. 11.

For example, the radio receiver 100 may use the neural network 301 by inputting the data 510 into the neural network in a forward pass 902 manner. Using the trained model parameters 907 and the data 510, the neural network 301 can output the output dataset comprising the estimated bit values 201.

Figure 12:
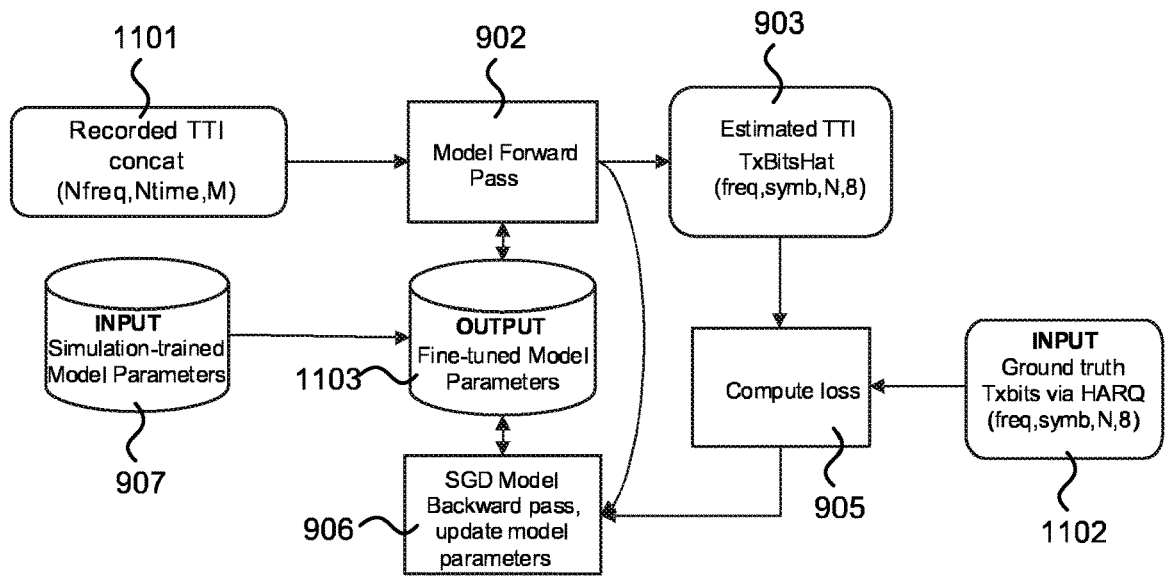
FIG. 12 illustrates another example embodiment of the subject matter described herein illustrating data flow in fine-tuning a trained neural network.

FIG. 12 illustrates another example embodiment of the subject matter described herein illustrating data flow in fine-tuning a trained neural network.

The trained model parameters 907 may be fine-tuned for specific location or situation after the training has been performed. The fine-tuning may be performed using, for example, data collected from the field. For the fine-tuning, the ground truth 1102 can be obtained via, for example, hybrid automatic repeat request (HARQ) resubmissions. This may allow obtaining training data also for cases where the decoding initially fails.

Fine-tuning of the parameters of the neural network 301 may be performed similarly to the training. The simulation-trained model parameters 907 may function as the starting point for fine-tuning. In the fine-tuning, recorded data 1101 may be used in place of the simulated data 901 used in training and the ground truth 1102 may be obtained via HARQ. The resulting parameters are fine-tuned parameters 1103.

Figure 13:
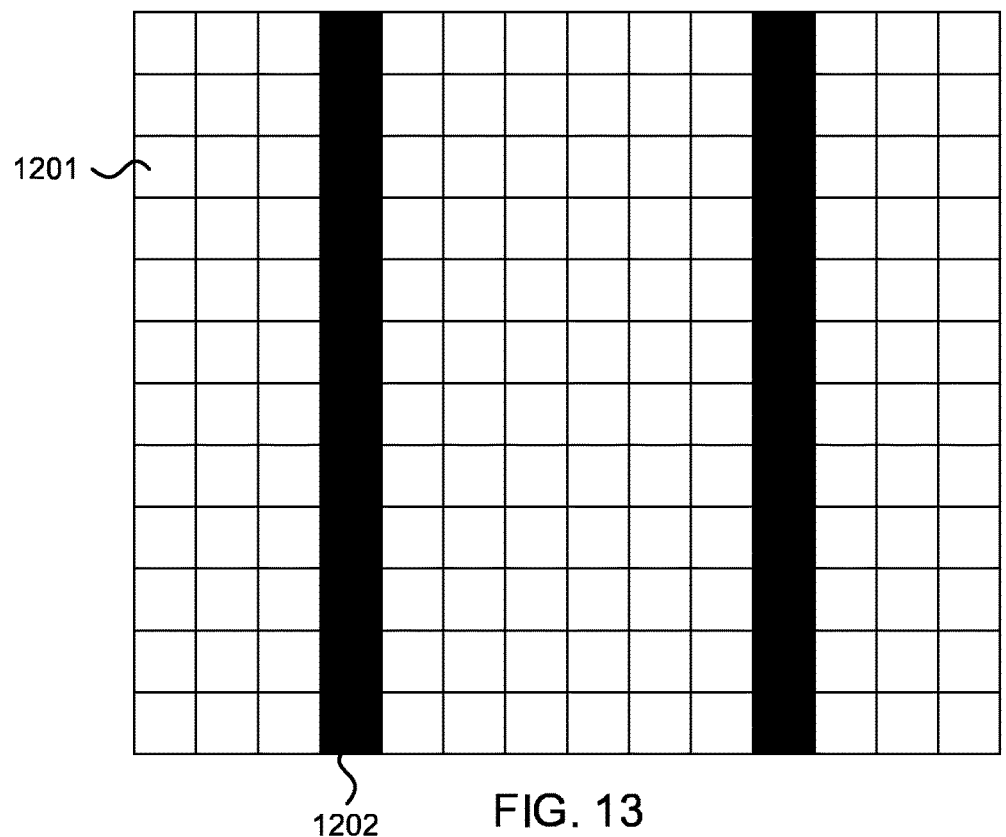
FIG. 13 illustrates a comparative example of the subject matter described herein illustrating resource allocation.

FIG. 13 illustrates a comparative example of the subject matter described herein illustrating resource allocation.

The comparative example of FIG. 13 illustrates a frame structure comprising data resource elements 1201 and pilot signal resource elements 1202. The frame structure comprises two pilot signals 1202 separated in time for every subcarrier. This type of frame structure may be implemented in, for example, 4G physical uplink shared channel (PUSCH).

Figure 14:
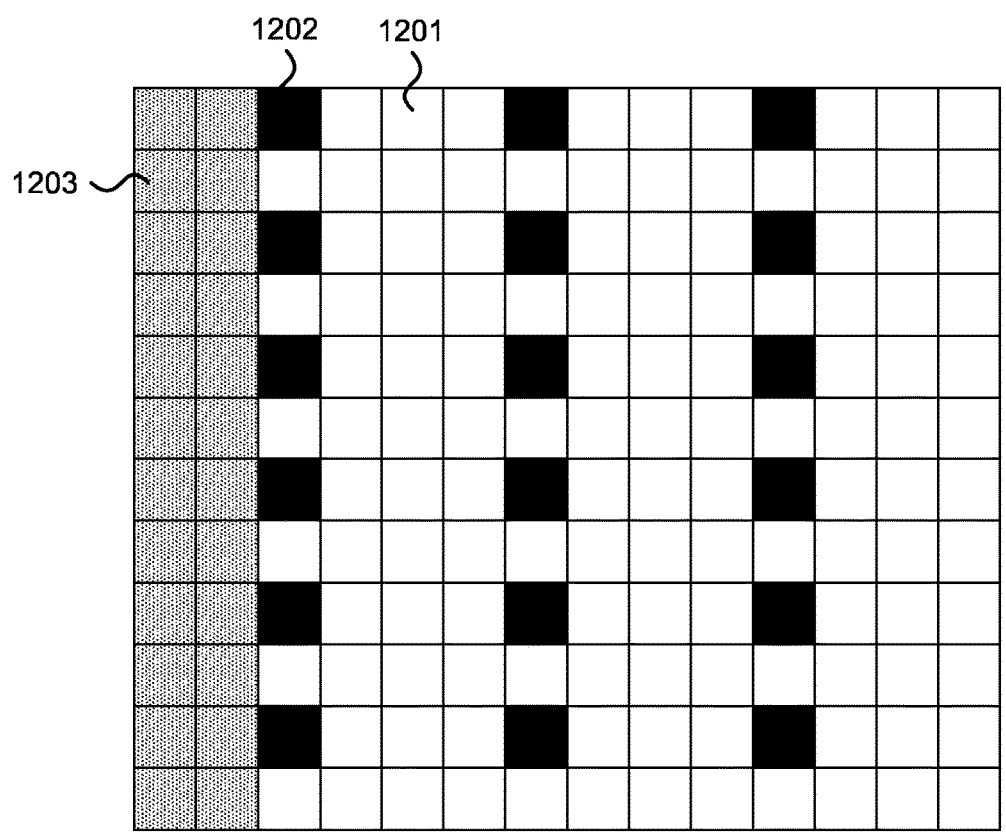
FIG. 14 illustrates another example embodiment of the subject matter described herein illustrating resource allocation.

FIG. 14 illustrates another example embodiment of the subject matter described herein illustrating resource allocation.

The example embodiment of FIG. 14 illustrates a frame structure comprising data resource elements 1201, pilot signal resource elements 1202, and other resource elements 1203. This type of frame structure may be implemented in, for example, 5G PUSCH. As can be seen by comparing the example embodiment of FIG. 14 to the comparative example of FIG. 13, in 5G PUSCH frame structure, the number of pilot signals 1202, and their location may be allocated more freely compared to 4G.

Figure 15:
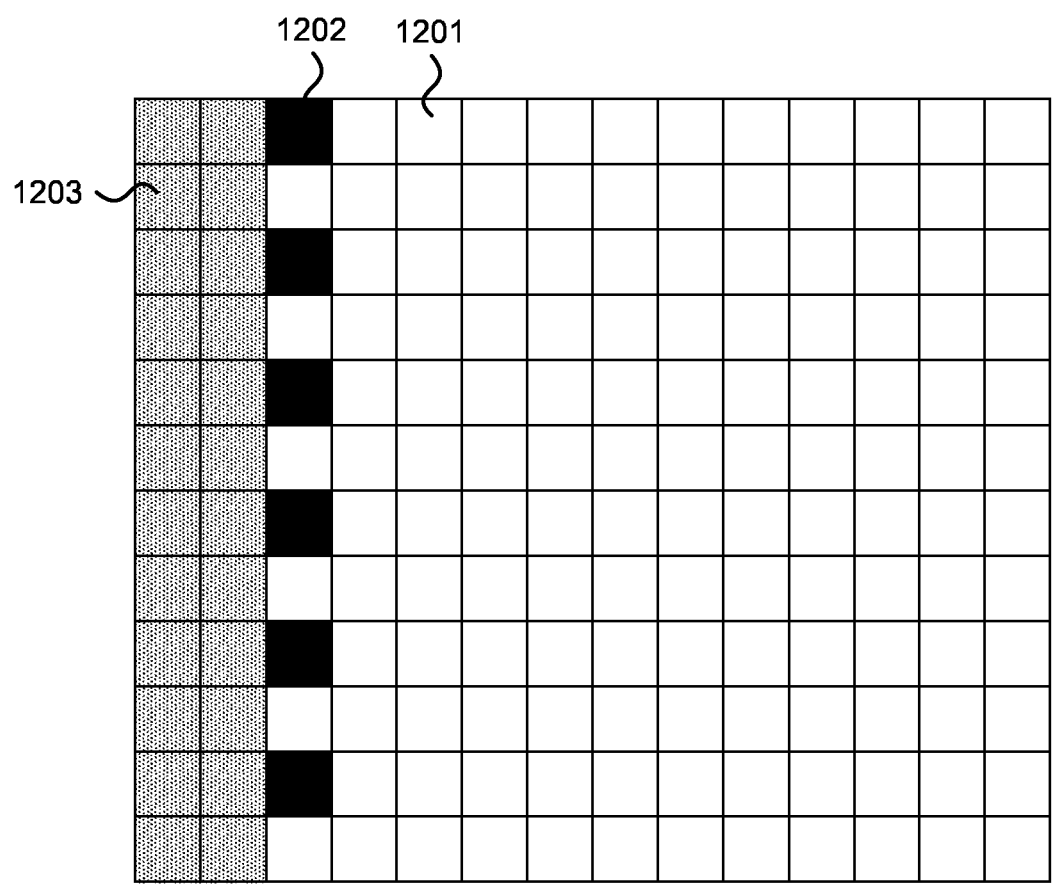
FIG. 15 illustrates another example embodiment of the subject matter described herein illustrating resource allocation.

FIG. 15 illustrates another example embodiment of the subject matter described herein illustrating resource allocation.

The neural network 301 of the receiver 100 may learn to estimate the channel more efficiently also from data symbol distributions. Thus, the number of resource elements allocated to pilot signals 1202 may be reduced, which may result in greater throughput. An example embodiment of frame structure with a reduced number of pilots 1202 is illustrated in FIG. 15. Since the number of pilot signals 1202 and their location may be allocated more freely in 5G, the radio receiver 100 may be able to provide greater throughput in 5G.

At least in some example embodiments, the neural network 301 may be able to operate with various reference signal configurations. During the training, the neural network 301 can learn to interpolate channel estimates over various configurations the neural network 301 is trained with. Thus, there may be no need to manually program the radio receiver 100 for different configurations.

In at least some example embodiments, the neural network 301 can output a different number of bits, depending on the used modulation schemes.

In at least some example embodiments, the neural network 301 can handle spatial multiplexing when the UEs and the BS have MIMO antenna arrays. UE scheduling information can be a vector or a matrix comprised in the data 510.

In at least some example embodiments, the radio receiver 100 can process different UEs that have been scheduled on adjacent resource blocks. Different UEs are likely to have different constellations and reference signal configurations.

At least some example embodiments may simplify the implementation of the radio receiver 100. The neural network 301 can learn to perform channel estimation, multi-antenna equalization, frequency offset (e.g. Doppler shift) estimation/compensation, and/or LLR estimation. The neural network 301 may be able to handle different reference signal configurations without the need to program them manually. The neural network 301 may require only Rx data and ground truth symbols for training. There may be no need for channel or SNR estimates.

At least some example embodiments may utilize the neural network 301 on the physical layer while still being standard-compliant.

In at least some example embodiments, implementing the whole RX chain with one neural network 301 may result in greater performance. Parallelization may be straightforward. Complexity and power consumption may be reduced. This may be further improved by incorporating other parts of receiver processing into the neural network 301, while still being able to differentiate and train the neural network 301 in an end-to-end fashion. It may be beneficial to use high-performance neural network inference chips, such as 1-bit architectures.

In at least some example embodiments, the training may require only a simulation of a transmitter and a channel. Receiving may be learned from the data. Amount of program code in the radio receiver 100 may be reduced, since functionality can be learned from training data.

In some example embodiments, time domain RX data is fed to the neural network 301 directly and neural network 301 performs FFT or similar operation. FFT can be a fixed part of the neural network 301 or similar behavior may be learned.

In some example embodiments, depth-wise separable convolutions may be performed for reduced number of parameters and faster inference.

In some example embodiments, the radio receiver 100 may comprise long short-term memory (LSTM) for storing channel information between TTIs.

In some example embodiments, the radio receiver 100 can be split and run in multiple nodes as, for example, the components of combined multipoint receiver (UlCoMP).

In some example embodiments, the neural network 301 can output detected symbols instead of LLRs by adjusting the last layer.

In some example embodiments, a UE mask can be implemented for receiving simultaneously from multiple UEs with flexible frequency assignment.

In some example embodiments, blocks of frequencies can be input to the neural network 301 instead of all subcarrier frequencies.

Figure 16:
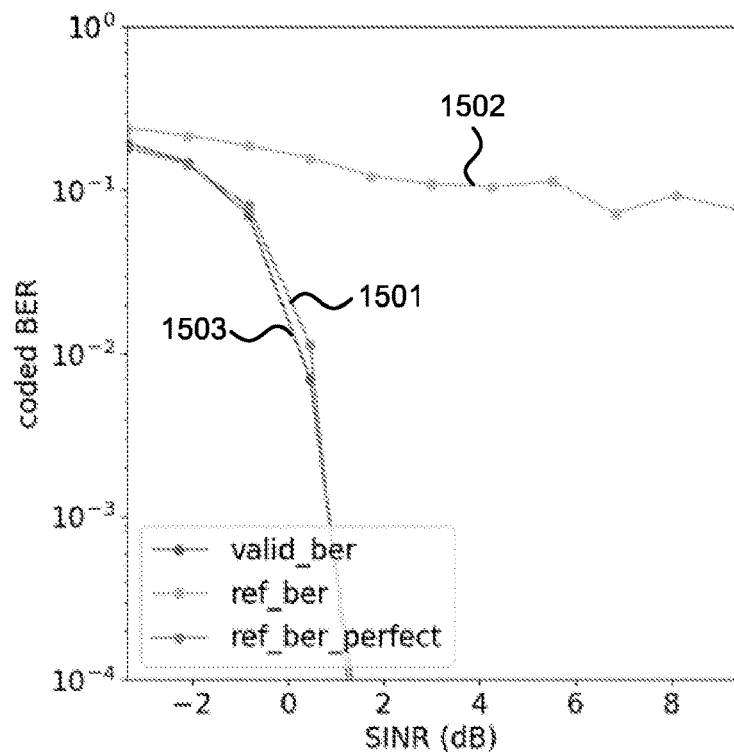
FIG. 16 illustrates another example embodiment of the subject matter described herein illustrating simulation results.

FIG. 16 illustrates an example embodiment of the subject matter described herein illustrating simulation results.

In the example embodiment of FIG. 16, simulation results are presented for 5G 2Rx single-input and multiple-output (SIMO) receiver, with no interference, with mobile UEs with random speed, and with one pilot signal in time. The plot of FIG. 16 illustrates the coded bit error rate (BER) as a function of the signal-to-interference-plus-noise ratio (SINR).

Curve 1501 correspond to the radio receiver 100, curve 1502 correspond to a reference receiver, and curve 1503 corresponds to a reference receiver with full channel information. The reference receiver with full channel information may correspond to an ideal receiver in the sense that it knows the channel perfectly. However, it may not be able to perform any type of interference rejection/cancellation or Doppler spread compensation.

Figure 17:
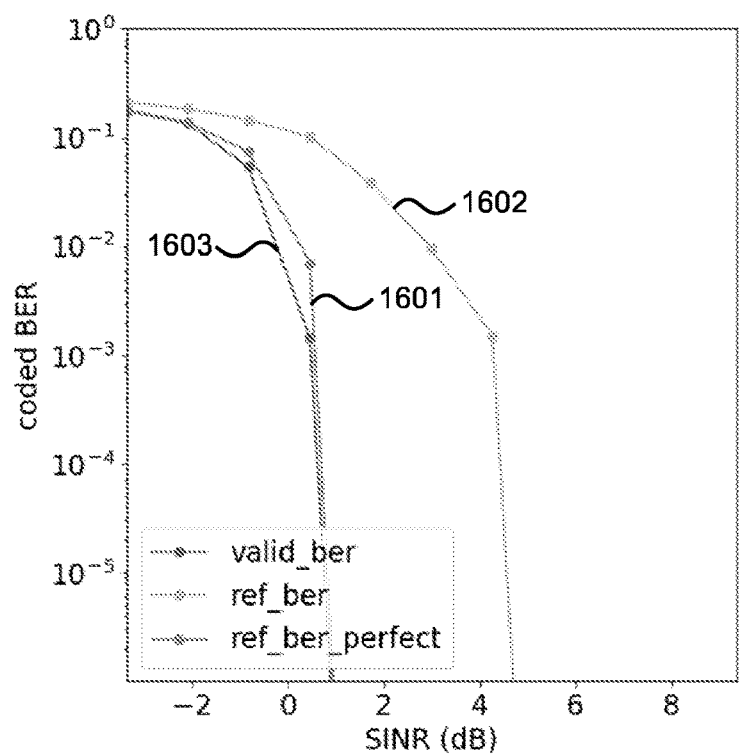
FIG. 17 illustrates another example embodiment of the subject matter described herein illustrating simulation results.

FIG. 17 illustrates an example embodiment of the subject matter described herein illustrating simulation results.

In the example embodiment of FIG. 17, simulation results are presented for 5G 2Rx SIMO receiver, with no interference, with mobile UEs with random speed, and with two pilot signals in time. The plot of FIG. 17 illustrates the coded BER as a function of the SINR.

Curve 1601 correspond to the radio receiver 100, curve 1602 correspond to a reference receiver, and curve 1603 corresponds to a reference receiver with full channel information.

Figure 18:
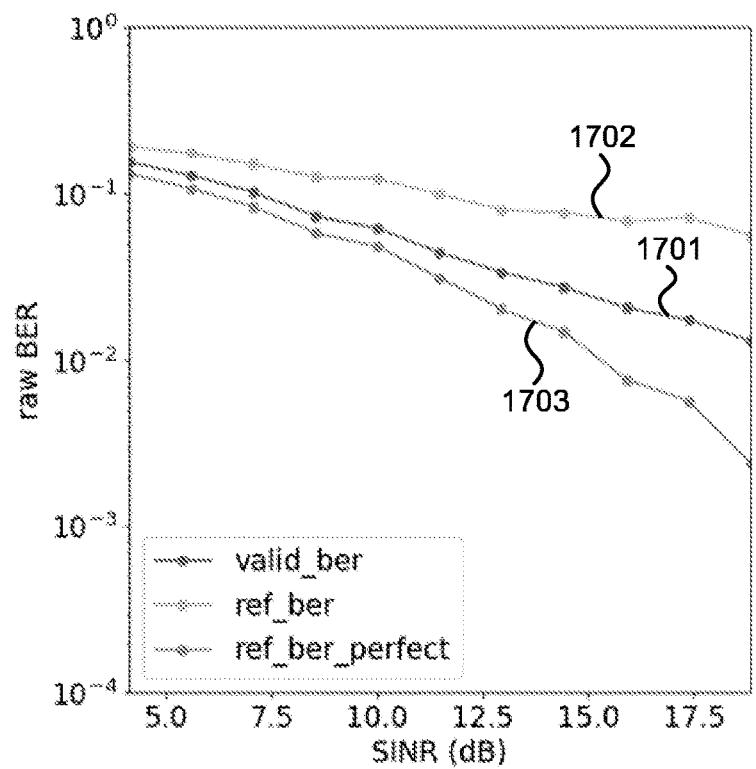
FIG. 18 illustrates another example embodiment of the subject matter described herein illustrating simulation results.

FIG. 18 illustrates an example embodiment of the subject matter described herein illustrating simulation results.

In the example embodiment of FIG. 18, simulation results are presented for 5G 2×4 MIMO receiver, with four pilot configurations comprising one or two pilot signals in time, and with 3GPP channel models chosen randomly. Different channel models were used for training and validation. The plot of FIG. 18 illustrates the raw BER as a function of the SINR.

Curve 1701 correspond to the radio receiver 100, curve 1702 correspond to a reference receiver, and curve 1703 corresponds to a reference receiver with full channel information.

Figure 19:
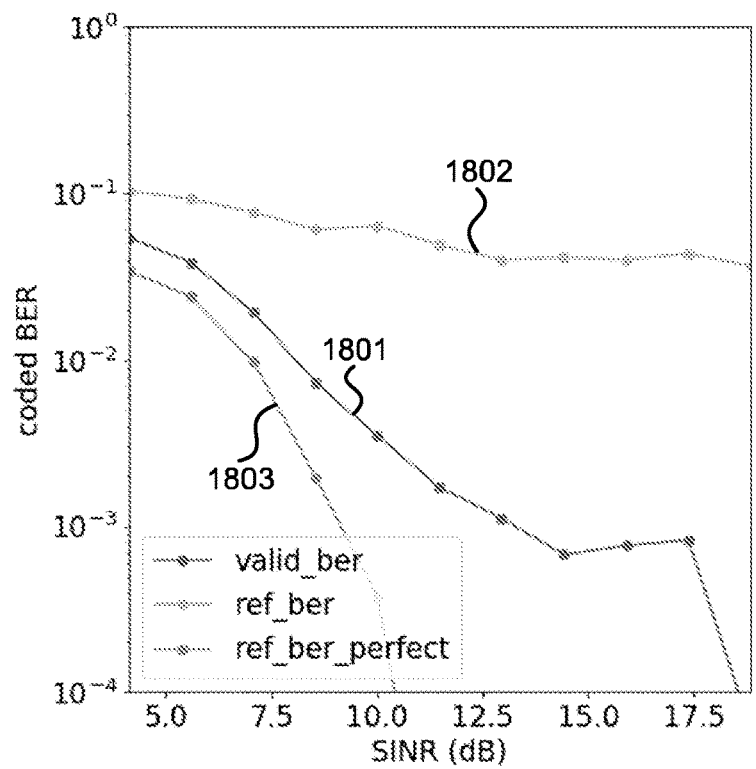
FIG. 19 illustrates another example embodiment of the subject matter described herein illustrating simulation results.

FIG. 19 illustrates an example embodiment of the subject matter described herein illustrating simulation results.

The plot of FIG. 19 illustrates the coded BER as a function of the SINR for the simulation described above in relation to FIG. 18.

Curve 1801 correspond to the radio receiver 100, curve 1802 correspond to a reference receiver, and curve 1803 corresponds to a reference receiver with full channel information.

Figure 20:
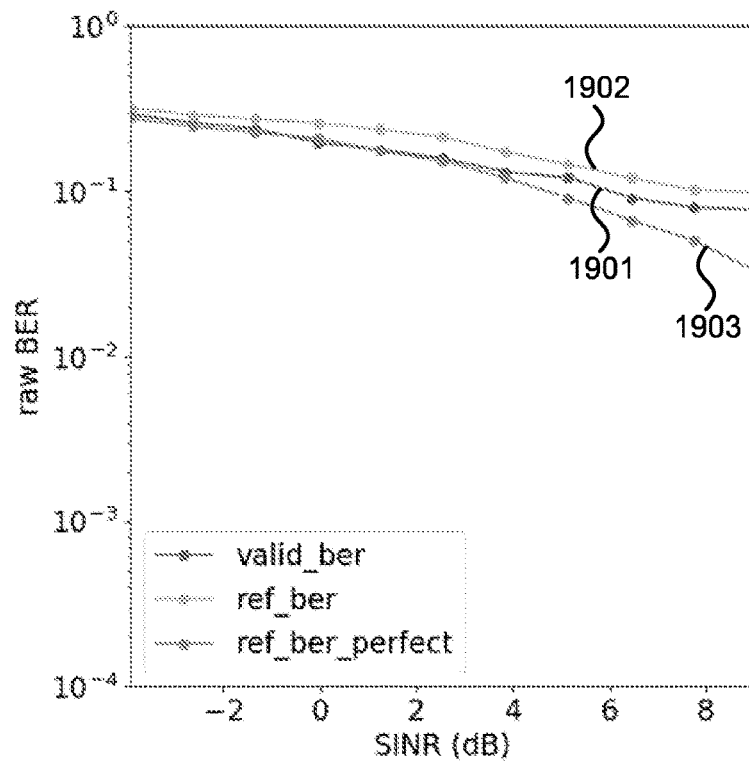
FIG. 20 illustrates another example embodiment of the subject matter described herein illustrating simulation results.

FIG. 20 illustrates an example embodiment of the subject matter described herein illustrating simulation results.

In the example embodiment of FIG. 20, simulation results are presented for 2RX SIMO downlink channel estimator, with one or two pilots in time, and with interference. The plot of FIG. 20 illustrates the raw BER as a function of the SINR.

Curve 1901 correspond to the radio receiver 100, curve 1902 correspond to a reference receiver, and curve 1903 corresponds to a reference receiver with full channel information.

Figure 21:
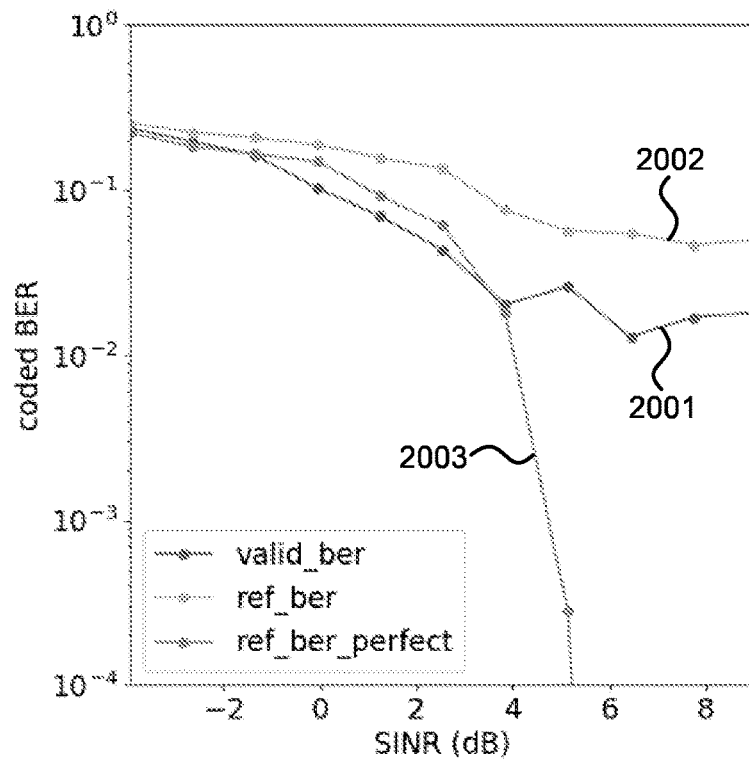
FIG. 21 illustrates another example embodiment of the subject matter described herein illustrating simulation results.

FIG. 21 illustrates an example embodiment of the subject matter described herein illustrating simulation results.

The plot of FIG. 21 illustrates the coded BER as a function of the SINR for the simulation described above in relation to FIG. 20.

Curve 2001 correspond to the radio receiver 100, curve 2002 correspond to a reference receiver, and curve 2003 corresponds to a reference receiver with full channel information.

Figure 22:
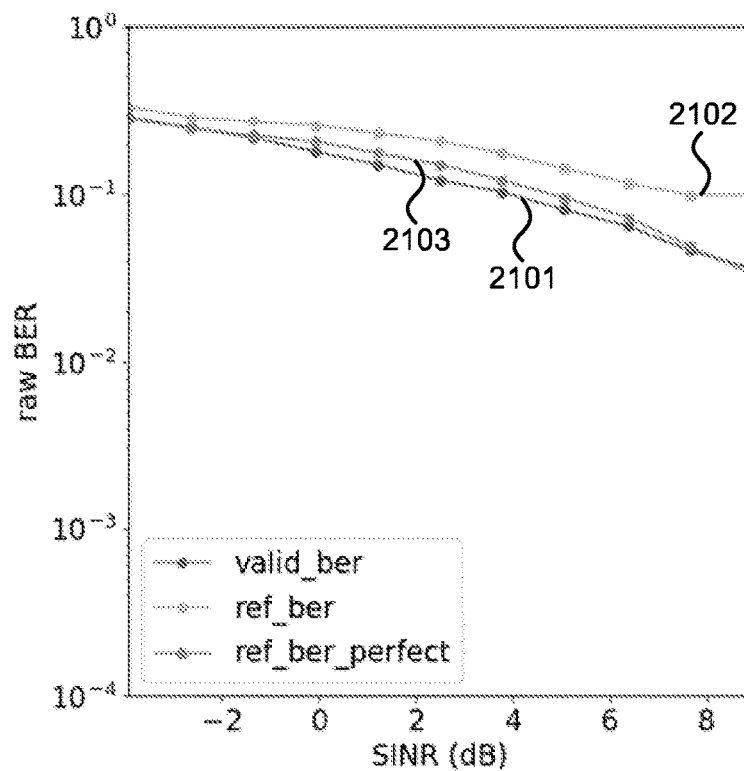
FIG. 22 illustrates another example embodiment of the subject matter described herein illustrating simulation results.

FIG. 22 illustrates an example embodiment of the subject matter described herein illustrating simulation results.

In the example embodiment of FIG. 22, simulation results are presented for 2RX SIMO radio receiver, with one or two pilot signals in time, and with interference. The plot of FIG. 22 illustrates the raw BER as a function of the SINR.

Curve 2101 correspond to the radio receiver 100, curve 2102 correspond to a reference receiver, and curve 2103 corresponds to a reference receiver with full channel information.

Figure 23:
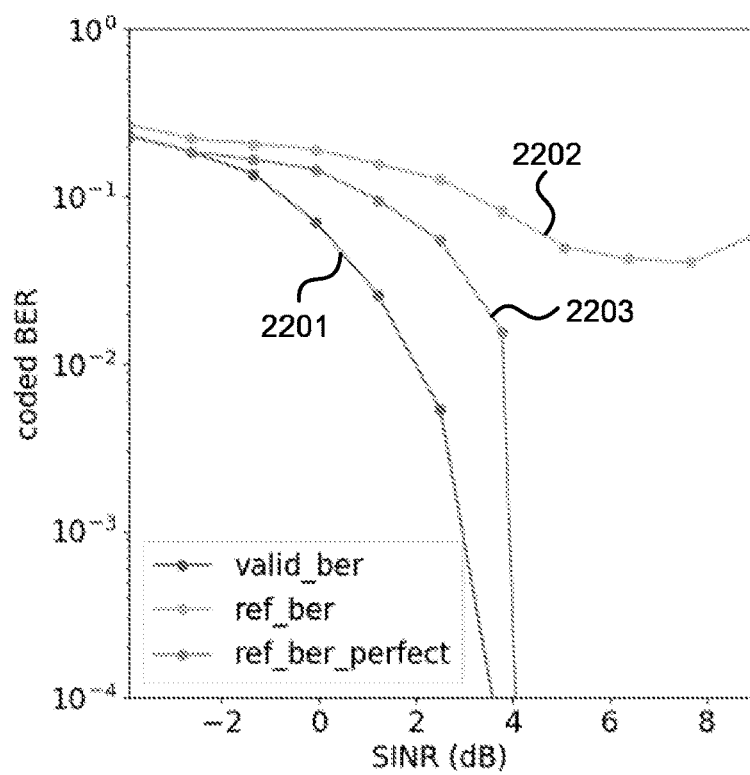
FIG. 23 illustrates another example embodiment of the subject matter described herein illustrating simulation results.

FIG. 23 illustrates an example embodiment of the subject matter described herein illustrating simulation results.

The plot of FIG. 23 illustrates the coded BER as a function of the SINR for the simulation described above in relation to FIG. 22.

Curve 2201 correspond to the radio receiver 100, curve 2202 correspond to a reference receiver, and curve 2203 corresponds to a reference receiver with full channel information.

An apparatus may comprise means for performing any aspect of the method(s) described herein. According to an example embodiment, the means comprises at least one processor, and memory comprising program code, the at least one processor, and program code configured to, when executed by the at least one processor, cause performance of any aspect of the method.

The functionality described herein can be performed, at least in part, by one or more computer program product components such as software components. According to an example embodiment, the radio receiver 100 comprises a processor configured by the program code when executed to execute the example embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Graphics Processing Units (CPUs).

Any range or device value given herein may be extended or altered without losing the effect sought. Also any example embodiment may be combined with another example embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example embodiment or may relate to several example embodiments. The example embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the example embodiments described above may be combined with aspects of any of the other example embodiments described to form further example embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual example embodiments, those skilled in the art could make numerous alterations to the disclosed example embodiments without departing from the spirit or scope of this specification.

The invention claimed is:

1. A radio receiver, comprising:
   at least one processor; and
   at least one memory including computer program code;
   the at least one memory and the computer program code configured to, with the at least one processor, cause the radio receiver to:
   obtain a data array comprising a plurality of elements, wherein each element in the plurality of elements in the data array corresponds to a subcarrier in a plurality of subcarriers and to a timeslot in a time interval;
   obtain a reference signal array representing a reference signal configuration applied during the time interval;
   implement a neural network;
   input data into the neural network, wherein the data comprises at least the data array and the reference signal array;
   wherein the reference signal array comprises a plurality of convolutional channels, wherein each convolutional channel in the plurality of convolutional channels in the reference signal array corresponds to a layer of a multiple-input and multiple-output transmission;
   wherein the neural network is configured to, based on the data, output an output array representing values of the plurality of elements in the data array, wherein the values comprise bits or symbols.

2. The radio receiver according to claim 1, wherein the neural network comprises a convolutional neural network.

3. The radio receiver according to claim 1, wherein the reference signal array comprises a plurality of reference signals, wherein a location in the reference signal array of each reference signal in the plurality of reference signals indicates a subcarrier of the reference signal and a timeslot of the reference signal.

4. The radio receiver according to claim 3, wherein the reference signal array further comprises a preconfigured indicator value in each location of the reference signal array not comprising a reference signal.

5. The radio receiver according to claim 1, wherein the neural network further comprises at least one residual block.

6. The radio receiver according to claim 1, wherein the at least one memory and the computer program code are further configured to, with the at least one processor, cause the radio receiver to:
   obtain a frequency array representing subcarrier frequencies of the plurality of subcarriers;
   wherein the data further comprises the frequency array.

7. The radio receiver according to claim 6, wherein at least one convolutional channel in the plurality of convolutional channels corresponds to the frequency array.

8. The radio receiver according to claim 1, wherein the data array comprises a plurality of convolutional channels and data from a plurality of antenna streams, wherein each convolutional channel in the data array corresponds to an antenna stream in the plurality of antenna streams.

9. The radio receiver according to claim 1, wherein the at least one memory and the computer program code are further configured to, with the at least one processor, cause the radio receiver to:
   extract a subset of bits from each element of the output array based on a modulation scheme used for the time interval and for the plurality of subcarriers.

10. The radio receiver according to claim 1, wherein the at least one memory and the computer program code are further configured to, with the at least one processor, cause the radio receiver to perform the obtaining the data array with performing:
    receive raw data using a plurality of samples during the time interval; and perform a Fourier transform on the received raw data, producing the data array.

11. A client device comprising the radio receiver according to claim 1.

12. A network node device comprising the radio receiver according to claim 1.

13. The radio receiver according to claim 1, wherein the at least one memory and the computer program code are configured to, with the at least one processor, cause the radio receiver to train the neural network with:
    obtaining a training input dataset and a ground truth corresponding to the training input dataset;
    inputting the training input dataset into the neural network, wherein the training input dataset comprises a training data array comprising a plurality of elements, wherein each element in the plurality of elements in the training data array corresponds to a sub carrier in a plurality of subcarriers and to a timeslot in a time interval;
    receiving an estimated output of the training input dataset from the neural network representing bit values of the plurality of elements in the training data array;
    extracting a subset of bits from each element of the estimated output based on a modulation scheme used for the training input dataset;
    computing a cost function based on the extracted bits and bits comprised in the ground truth; and
    adjusting at least one parameter of the neural network according to the computed cost function.

14. A computer program product comprising a non-transitory program storage device encoded with computer program code configured to perform the training according to claim 13, when the computer program code is executed on a computer.

15. A method for training a neural network of a radio receiver, the method comprising:
    obtaining a training input dataset and a ground truth corresponding to the training input dataset;
    inputting the training input dataset into the neural network, wherein the training input dataset comprises a training data array comprising a plurality of elements, wherein each element in the plurality of elements in the training data array corresponds to a sub carrier in a plurality of subcarriers and to a timeslot in a time interval;
    receiving an estimated output of the training input dataset from the neural network representing bit values of the plurality of elements in the training data array;
    extracting a subset of bits from each element of the estimated output based on a modulation scheme used for the training input dataset;
    computing a cost function based on the extracted bits and bits comprised in the ground truth; and adjusting at least one parameter of the neural network according to the computed cost function.

16. A computer program product comprising a non-transitory program storage device encoded with computer program code configured to, when the computer program code is executed with a computer, perform:
  obtaining a training input dataset and a ground truth corresponding to the training input dataset;
  inputting the training input dataset into a neural network, wherein the training input dataset comprises a training data array comprising a plurality of elements, wherein each element in the plurality of elements in the training data array corresponds to a sub carrier in a plurality of subcarriers and to a timeslot in a time interval;
  receiving an estimated output of the training input dataset from the neural network representing bit values of the plurality of elements in the training data array;
  extracting a subset of bits from each element of the estimated output based on a modulation scheme used for the training input dataset;
  computing a cost function based on the extracted bits and bits comprised in the ground truth; and
  adjusting at least one parameter of the neural network according to the computed cost function.

* * * * *